United States Patent
Kurotsu

(10) Patent No.: US 6,801,444 B2
(45) Date of Patent: Oct. 5, 2004

(54) POWER CIRCUIT

(75) Inventor: Satoru Kurotsu, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 10/434,221

(22) Filed: May 9, 2003

(65) Prior Publication Data

US 2003/0210023 A1 Nov. 13, 2003

(30) Foreign Application Priority Data

May 10, 2002 (JP) ........................... 2002-136171

(51) Int. Cl.[7] .................................................. H02M 3/06
(52) U.S. Cl. ......................................................... 363/62
(58) Field of Search ............................. 363/62; 323/209; 307/110

(56) References Cited

U.S. PATENT DOCUMENTS

| | | | | |
|---|---|---|---|---|
| 6,198,645 B1 | * | 3/2001 | Kotowski et al. | 363/59 |
| 6,304,007 B1 | * | 10/2001 | Yu | 307/110 |
| 6,429,632 B1 | * | 8/2002 | Forbes et al. | 323/282 |
| 6,654,263 B2 | * | 11/2003 | Kurotsu | 363/60 |
| 6,657,875 B1 | * | 12/2003 | Zeng et al. | 363/59 |
| 6,661,683 B2 | * | 12/2003 | Botker et al. | 363/60 |
| 6,693,808 B2 | * | 2/2004 | Myono | 363/62 |

FOREIGN PATENT DOCUMENTS

JP 52-027516 1/1977

OTHER PUBLICATIONS

"LM3352 Regulated 200 mA Buck–Boost Switched Capacitor DC/DC Converter" Sep. 1999; National Semiconductor Corporation.

* cited by examiner

Primary Examiner—Adolf Berhane
(74) Attorney, Agent, or Firm—Rabin & Berdo, P.C.

(57) ABSTRACT

In a power circuit, first and second voltage-dividing capacitors are connected in series between first and second power terminals in even cycles. On the other hand, the first and second voltage-dividing capacitors are connected in series between the second and first power terminals in odd cycles, which occur alternately with the even cycles.

22 Claims, 10 Drawing Sheets

EVEN CYCLE $Va = VDD \cdot C2/(C1+C2)$
$Vb = VDD \cdot C1/(C1+C2)$

ODD CYCLE

EVEN CYCLE $Va = VDD*C2/(C1+C2)$
$Vb = VDD*C1/(C1+C2)$

ODD CYCLE

EVEN CYCLE

ODD CYCLE

POWER CIRCUIT

CROSS REFERENCE TO RELATED APPLICATION

This application claims the priority of Application No. 2002-136171, filed May 10, 2002 in Japan, the subject matter of which is incorporated herein by reference.

TECHNICAL FIELD OF THE INVENTION

This invention relates to a power circuit, and more particularly to, a step-down power circuit, performs DC—DC conversion. Such a step-down power circuit may be called "switched capacitor type power circuit".

BACKGROUND OF THE INVENTION

A conventional step-down power circuit is shown in "National Semiconductor Co. Ltd., Lm3352 Regulated 200 mA Buck-Boost. Switched-Capacitor DC—DC converter, 1993-3.

The conventional step-down power circuit usually includes voltage-dividing capacitors, smoothing capacitors and switch circuits. In a charging cycle, a voltage-dividing capacitor and a smoothing capacitor are connected between a power supply terminal VDD and a ground terminal GND, so that each of the capacitors is charged to a voltage of VDD/2. In a discharging cycle, a voltage-dividing capacitor and a smoothing capacitor are now connected between an output terminal and the ground terminal GND.

Such charging and discharging cycles are repeated alternately at a high speed, so that an output voltage having a voltage level of VDD/2, which is step-downed, is outputted from the output terminal. According to the above-described power circuit, the output voltage Vo is almost fixed at VDD/2.

OBJECTS OF THE INVENTION

Accordingly, an object of the present invention is to provide a power circuit, which can supplies a required or desired output power with a simple structure.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, a power circuit includes: a first power node supplying a first level of power; a second power node supplying a second level of power, which is lower than the first level; a first voltage-dividing capacitor, comprising an anode which is capable to be connected to the first power node and a cathode which is capable to be connected to the second power node; a second voltage-dividing capacitor, comprising an anode which is capable to be connected to the first power node and a cathode which is capable to be connected to the second power node; and an output terminal supplying an output voltage in first and second cycles, which are occurred alternately.

The power circuit also includes a control circuit functioning to connect, in the first cycle, the anode of the first voltage dividing capacitor to the first power node, the cathode of the first voltage dividing capacitor to the output terminal and to the anode of the second voltage-dividing capacitor, and the cathode of the second voltage-dividing capacitor to the second power node; and in the second cycle, the anode of the second voltage dividing capacitor to the first power node, the cathode of the second voltage dividing capacitor to the output terminal and to the anode of the first voltage-dividing capacitor, and the cathode of the first voltage-dividing capacitor to the second power node.

According to a second aspect of the present invention, a method includes the steps of providing first and second voltage-dividing capacitors; providing a first power terminal supplying a first level of power and a second power terminal supplying a second level of power, which is lower than the first level; connecting the first and second voltage-dividing capacitors in series between the first and second power terminals in even cycles; and connecting the first and second voltage-dividing capacitors in series between the second and first power terminals in odd cycles, which occur alternately with the even cycles.

According to another aspect of the present invention, a method of power supply, including the following steps:
1) providing first and second voltage-dividing capacitors;
2) providing a first power terminal supplying a first level of power and a second power terminal supplying a second level of power, which is lower than the first level;
3) connecting the first and second voltage-dividing capacitors in series between the first and second power terminals in even cycles; and
4) connecting the first and second voltage-dividing capacitors in series between the second and first power terminals in odd cycles, which occur alternately with the even cycles.

Preferably, the above method further includes the steps of: providing first and second output nodes; and compensating the difference of electric charge between the first output node and the second output node.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
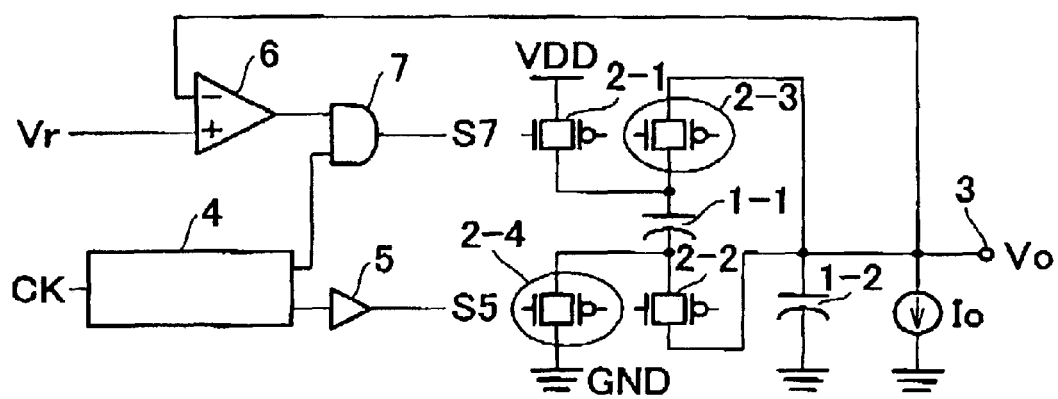
FIG. 1 is a circuit diagram showing a power circuit.

FIG. 1 is a circuit diagram showing a power circuit, which includes a voltage-dividing capacitor 1—1 and a smoothing capacitor 1-2; switch circuits 2-1 and 22 for charging; and switch circuits 2-3 and 2-4 for discharging. The switch circuits 2-1 to 2-4 are controlled to change connecting condition of the capacitors 1—1 and 1-2. The switch 2-1, voltage-dividing capacitor 1—1, switch circuit 2—2 and smoothing capacitor 1-2 are serially connected between a power supply node VDD and a ground node GND. An output terminal 3 is connected to a connecting point of the switch circuit 2—2 and the smoothing capacitor 1-2. The output terminal 3 outputs an output voltage Vo and an output current Io. The switch circuit 2-3, voltage-dividing capacitor 1—1 and switch circuit 2-4 are serially connected between the output terminal 3 and the ground terminal GND. The switch circuits 2-1 and 2—2 are turned on in accordance with a switch signal S5 in a charging cycle. The switch circuits 2-3 and 2-4 are turned on in accordance with a switch signal S7 in a discharging cycle.

In the charging cycle, the switch circuits 2-1 and 22 are turned on in response to the switch signal S5 and the switch circuits 2-3 and 2-4 are turned off in response to the switch signal S7. The voltage-dividing capacitor 1—1 and smoothing capacitor 1-2 are connected between the power supply terminal VDD and the ground terminal GND, so that each of the capacitors 1—1 and 1-2 is charged to a voltage of VDD/2. In the discharging cycle, the switch circuits 2-3 and 2-4 are turned on in response to the switch signal S7, and the switch circuits 2-1 and 2—2 are turned off in response to the switch signal S5. The voltage-dividing capacitor 1—1 and smoothing capacitor 1-2, each of which has been charged at VDD/2, are now connected between the output terminal 3 and the ground terminal GND, Such charging and discharging cycles are repeated alternately at a high speed in accordance with the switch signals S5 and S7, so that an output voltage Vo having a voltage level of VDD/2, which is step-downed, is outputted from the output terminal 3 steadily.

According to the above-described power circuit, the output voltage Vo is almost fixed at VDD/2 in accordance with the capacitance of the capacitors 1—1 and 1-2 and their connecting condition. However, the output voltage Vo can be set at other voltage levels.

In order to obtain other levels of output voltage, a switch signal control circuit may be used as shown at a left region in FIG. 1. The switch signal control circuit includes a switching pulse generating circuit 4, a buffer 5, an operational amplifier 6, and an AND gate 7. The switching pulse generating circuit 4 generates switching pulse signals based on a clock signal CK. The buffer 5 outputs the switch signal S5 for charging. The operational amplifier 6 compares the output voltage Vo with a predetermined reference voltage Vr. The AND gate 7 outputs the switch signal S7 for discharging in accordance with the output signals from the operational amplifier 6 and switching pulse generating circuit 4.

First Preferred Embodiment

Figure 2:
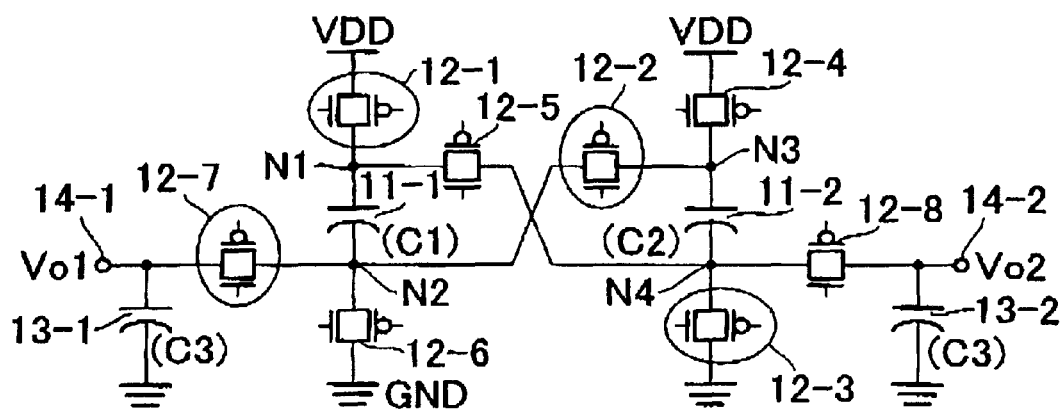
FIG. 2 is a circuit diagram showing a power circuit according to a first preferred embodiment of the present invention.

FIG. 2 is a circuit diagram showing a power circuit according to a first preferred embodiment of the present invention. The power circuit includes a voltage-dividing capacitor 11-1, having a capacitance of C1; another voltage-dividing capacitor 11-2, having a capacitance of C2; first to third and seventh switch circuits 12-1 to 12-3 and 12-7 for even cycles; fourth to sixth and eighth switch circuits 12-4 to 12-6 and 12-8 for odd cycles; a first smoothing capacitor 13-1, which has a capacitance of C3 and is connected to a first output terminal 14-1; and a second smoothing capacitor 13-2, which has a capacitance of C4 and is connected to a second output terminal 14-2.

The power circuit is designed to operate in a first (Even) cycle and a second (Odd) cycle. In the Even cycles, the first to third and seventh switch circuits 12-1 to 12-3 and 12-7 are turned on, while in the Odd cycles, the fourth to sixth and eighth switch circuits 12-5 to 12-6 and 12-8 are turned on. Those switch circuits 12-1 to 12-8 may be operated in accordance with a switching signal, supplied from a switching pulse generating circuit 4, shown in FIG. 1. Each of the switch circuits 12-1 to 12-8 is an analog switch including a PMOS transistor and a NMOS transistor.

A first power node (VDD node) is connected to a first node N1 via the first switch circuit 12-1. The first node N1 is connected to a second node N2 via anode and cathode of the voltage-dividing capacitor 11-2. The second node N2 is connected to a third node N3 via the switch circuit 12-2. The third node N3 is connected to a fourth node N4 via an anode and a cathode of the voltage-dividing capacitor 11-2. The fourth node N4 is connected to a second power node, GND node, via the switch circuit 12-3.

The VDD node is connected to the third node N3 via the switch circuit 12-4. The third node N3 is connected through anode and cathode of the voltage-dividing capacitor 11-2 to the fourth node N4. The fourth node N4 is connected to the first node N1 via the switch circuit 12-5. The first node N1 is connected to the second node N2 via anode and cathode of the voltage-dividing capacitor 11-1.

The second node N2 is connected to the GND node via the switch circuit 12-6. The second node N2 is connected to a first output terminal 14-1, which outputs a first output voltage Vo1, via the switch circuit 12-7. The first output terminal 14-1 is connected to the GND node via the first smoothing capacitor 13-1. The fourth node N4 is connected to a second output terminal 14-2, which outputs a second output voltage Vo2, via the switch circuit 12-8. The second output terminal 14-2 is connected to the GND node via the second smoothing capacitor 13-2.

In even cycles, the switch circuits 12-1 to 12-3 and 12-7 are turned on so that the anode and cathode of the voltage dividing capacitor 11-1 are connected to the VDD node and the first output terminal 14-1, respectively; and the anode and cathode of the voltage-dividing capacitor 11-2 are connected to the first output terminal 14-1 and the GND node, respectively. On the other hand, in odd cycles, the switch circuits 12-4 to 12-6 and 12-8 are turned on so that the anode and cathode of the voltage dividing capacitor 11-1 are connected to the second output terminal 14-2 and the GND node, respectively; and the anode and cathode of the voltage-dividing capacitor 11-2 are connected to the VDD node and the second output terminal 14-2, respectively. In such even cycles and odd cycles, the voltage-dividing capacitors 11-1 and 11-2 are alternated in position between the VDD node and GND node.

Figure 3A:
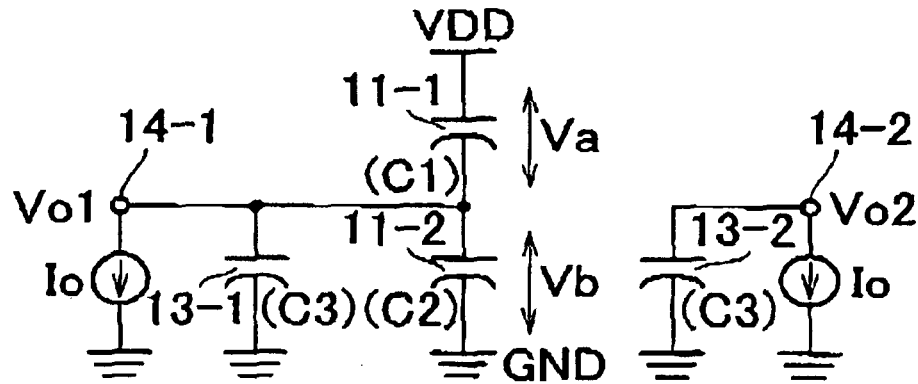
FIG. 3A is an equivalent circuit showing the power circuit of the power circuit according to the first preferred embodiment in even cycles.
Figure 3B:
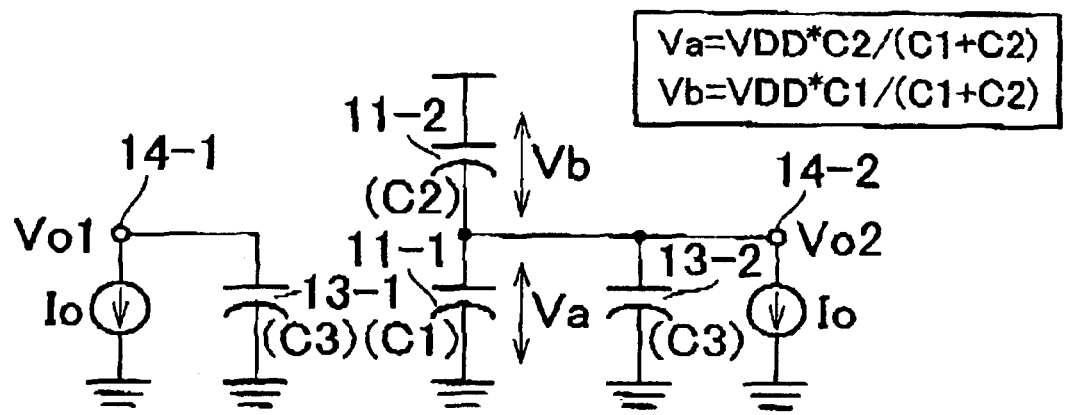
FIG. 3B is an equivalent circuit showing the power circuit of the power circuit according to the first preferred embodiment in odd cycles.
Figure 3C:
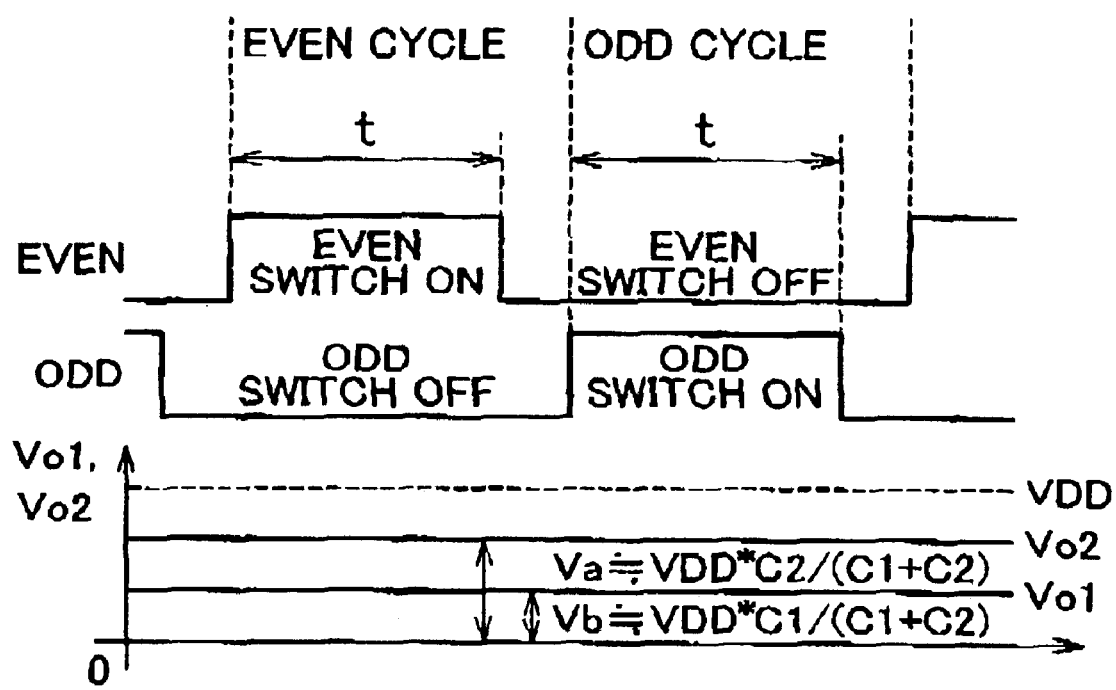
FIG. 3C is a timing chart showing the operation of the power circuit according to the first preferred embodiment, shown in FIG. 2.

FIG. 3A is an equivalent circuit showing the power circuit of the power circuit according to the first preferred embodiment in even cycles. FIG. 3B is an equivalent circuit showing the power circuit of the power circuit according to the first preferred embodiment in odd cycles. FIG. 3C is a timing chart showing the operation of the power circuit according to the first preferred embodiment, shown in FIG. 2.

As shown in FIG. 3A, in even cycles, the voltage-dividing capacitors 11-1 and 11-2 are serially connected between the VDD node and GND node, so that the voltage-dividing capacitors 11-1 and 11-2 are applied with voltages Va and Vb, respectively. The voltage Va and Vb are defined based on the capacitances C1 and C2 of the voltage-dividing capacitors 11-1 and 11-2. If the smoothing capacitor 13-1 has a capacitance, which is small enough to the capacitances C1 and C2 of the voltage-dividing capacitors 11-1 and 11-2, the voltage-dividing capacitor 11-1 is electric-charged at a voltage of "VDD*C2/(C1+C2)" and the voltage-dividing capacitor 11-2 is electric-charged at a voltage of "VDD*C1/(C1+C2)". At this time, the voltage-dividing capacitor 11-2 and the smoothing capacitor 13-1 are connected in parallel between the first output terminal 14-1 and the GND node, so that the first output terminal 14-1 is applied with a voltage of "VDD*C1/(C1+C2)".

On the other hand, in odd cycles, as shown in FIG. 3B, the voltage-dividing capacitors 11-1 and 11-2 are serially connected between the GND node and VDD node, so that the voltage-dividing capacitors 11-1 and 11-2 are applied with voltages Va and Vb, respectively. The voltage Va and Vb are defined based on the capacitances C1 and C2 of the voltage-dividing capacitors 11-1 and 11-2. If the smoothing capacitor 13-1 has a capacitance, which is small enough to the capacitances C1 and C2 of the voltage-dividing capacitors 11-1 and 11-2, the voltage-dividing capacitor 11-1 is electric-charged at a voltage of "VDD*C2/(C1+C2)" and the voltage-dividing capacitor 11-2 is electric-charged at a voltage of "VDD*C1/(C1+C2)". At this time, the voltage-dividing capacitor 11-1 and the smoothing capacitor 13-2 are connected in parallel between the second output terminal 14-2 and the GND node, so that the second output terminal 14-2 is applied with a voltage of "VDD*C2/(C1+C2)".

When the same amount of output current To is flowing through the first and second output terminals 14-1 and 14-2, and a period Tc of the even and odd cycle is short and met the formulas "Tc<<C3*Vo1/Io" and "Tc<<C3*Vo2/Io", the first and second output terminals 14-1 and 14-2 output step-down voltage signals of "Vo1≈VDD*C1/(C1+C2)" and "Vo2≈VDD*C2/(C1+C2)", respectively. The voltage Vo1 and Vo2 are calculated based on the ratio of capacitances between the voltage-dividing capacitors 11-1 and 11-2.

According to the above-described first preferred embodiment, the voltage-dividing capacitors 11-1 and 11-2 are connected to the VDD side and GND side, respectively, in even cycles, and are connected to the GND side and VDD side, respectively, in odd cycles, so that the following advantages can be obtained:

(i) Desired output voltages Vo1 and Vo2, which are defined in accordance with the ratio of capacitances between them, 0 can be provided.

(ii) At a high conversion efficiency, two output voltage signals Vo1 and Vo2 can be obtained at the same time.

(iii) It is not required to increase capacitors in order to obtain a specific output voltage other than VDD/2, because the output voltage levels Vo1 and Vo2 are defined based on the ratio of capacitances between the voltage-dividing capacitors 11-1 and 11-2.

Second Preferred Embodiment

Figure 4A:
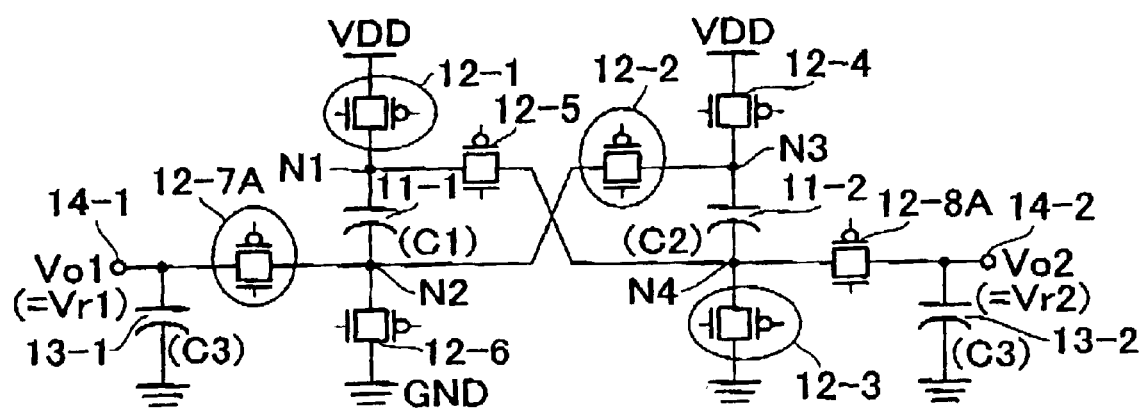
FIG. 4A is a circuit diagram showing a power circuit according to a second preferred embodiment of the present invention.
Figure 4B:
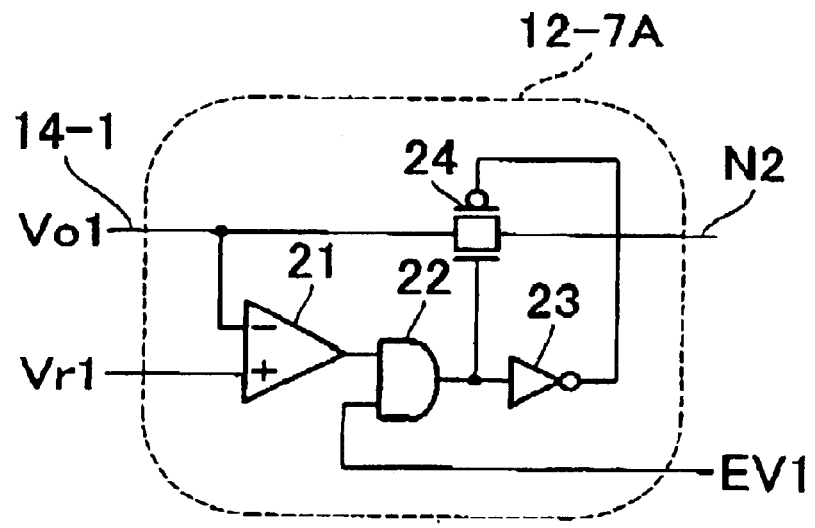
FIG. 4B is a circuit diagram showing a switch circuit used in the power circuit according to the second preferred embodiment, shown in FIG. 4A.
Figure 4C:
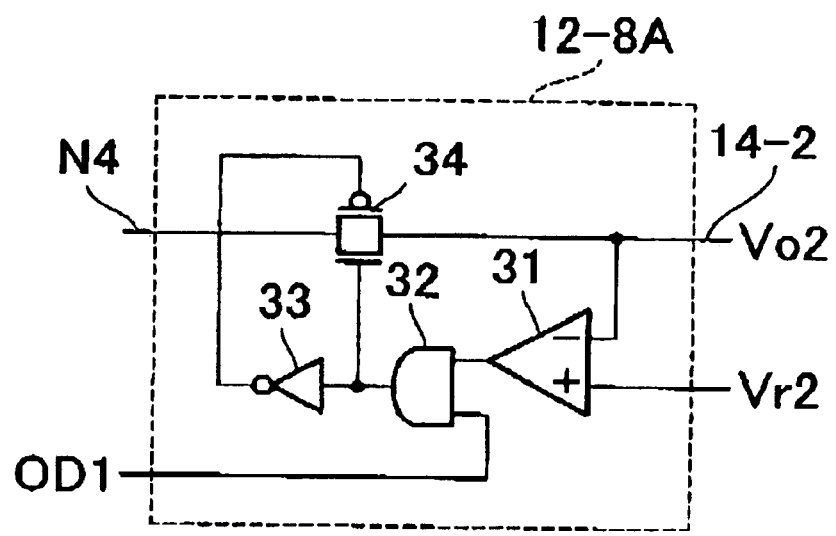
FIG. 4C is a circuit diagram showing another switch circuit used in the power circuit according to the second preferred embodiment, shown in FIG. 4A.

FIG. 4A is a circuit diagram showing a power circuit according to a second preferred embodiment of the present invention. FIG. 4B is a circuit diagram showing a switch circuit used in the power circuit according to the second preferred embodiment, shown in FIG. 4A. FIG. 4C is a circuit diagram showing another switch circuit used in the power circuit according to the second preferred embodiment, shown in FIG. 4A. In this embodiment, the same and corresponding elements to those in the first preferred embodiment, shown in FIGS. 2, 3A, 3B and 3C are represented by the same reference numerals and the same description is no repeated.

A power circuit according to the second preferred embodiment includes a voltage-dividing capacitor 11-1, having a capacitance of C1; another voltage-dividing capacitor 11-2, having a capacitance of C2; first to third and seventh switch circuits 12-1 to 12-3 and 12-7A for even cycles; fourth to sixth and eighth switch circuits 12-4 to 12-6 and 12-8A for odd cycles; a first smoothing capacitor 13-1, which has a capacitance of C3 and is connected to a first output terminal 14-1; and a second smoothing capacitor 13-2, which has a capacitance of C4 and is connected to a second output terminal 14-2.

The power circuit is designed to operate in a first (Even) cycle and a second (Odd) cycle. In the Even cycles, the first to third and seventh switch circuits 12-1 to 12-3 and 12-7 are turned on, while in the Odd cycles, the fourth to sixth and eighth switch circuits 12-4 to 12-6 and 12-8 are turned on. Those switch circuits 12-1 to 12-8 may be operated in accordance with a switching signal, supplied from a switching pulse generating circuit 4, shown in FIG. 1. Each of the switch circuits 12-1 to 12-6 is an analog switch including a PMOS transistor and a NMOS transistor.

A first power node (VDD node) is connected to a first node N1 via the first switch circuit 12-1. The first node N1 is connected to a second node N2 via anode and cathode of the voltage-dividing capacitor 11-2. The second node N2 is connected to a third node N3 via the switch circuit 12-2. The third node N3 is connected to a fourth node N4 via an anode and a cathode of the voltage-dividing capacitor 11-2. The fourth node N4 is connected to a second power node, GND node, via the switch circuit 12-3.

The VDD node is connected to the third node N3 via the switch circuit 12-4. The third node N3 is connected through anode and cathode of the voltage-dividing capacitor 11-2 to the fourth node N4. The fourth node N4 is connected to the first node N1 via the switch circuit 12-5. The first node N1 is connected to the second node N2 via anode and cathode of the voltage-dividing capacitor 11-1.

The second node N2 is connected to the GND node via the switch circuit 12-6. The second node N2 is connected to a first output terminal 14-1, which outputs a first output voltage Vo1, via the switch circuit 12-7. The first output terminal. 14-1 is connected to the GND node via the first smoothing capacitor 13-1. The fourth node N4 is connected to a second output terminal 14-2, which outputs a second output voltage Vo2, via the switch circuit 12-8. The second output terminal 14-2 is connected to the GND node via the second smoothing capacitor 13-2.

The switch circuit 12-7A includes an operational amplifier 21 for intermittent switching. The operational amplifier 21 includes a plus input terminal applied with a reference voltage Vr1 and a minus input terminal connected to the output terminal 14-1. An output terminal of the operational amplifier 21 is connected to an input terminal of an AND gate 22, which includes another input terminal to which a switching signal EV1 is supplied. The switching signal EV1 may be generated by a switching pulse generating circuit 4, shown in FIG. 1, and is in an on (high) state in even cycles. An output terminal of the AND gate 22 is connected to an input terminal of an inverter 23.

An analog switch 24 is connected between the output terminal 14-1 and the node N2, so that the switch 24 is turned on and off in accordance with output signals of the inverter 23 and AND gate 22. The analog switch 24 includes: a PMOS transistor, which is turned on/off in response to an output signal of the inverter 23; and a NMOS transistor, which is turned on/off in response to an output signal of the AND gate 22. Those PMOS and NMOS transistors are connected in parallel.

In the switch circuit 12-7A, the operational amplifier 21 compares the output voltage Vo1 and reference voltage Vr1. In even cycles, only when the output voltage Vo1 is smaller than the reference voltage Vr1, the switch 24 is turned on, The switch circuit 12-8A includes an operational amplifier 31 for intermittent switching. The operational amplifier 21 includes a plus input terminal applied with a reference voltage Vr2 and a minus input terminal connected to the output terminal 14-2. An output terminal of the operational amplifier 31 is connected to an input terminal of an AND gate 32, which includes another input terminal to which a switching signal OD1 is supplied. The switching signal OD1 may be generated by a switching pulse generating circuit 4, shown in FIG. 1, and is in an on (high) state in odd cycles. An output terminal of the AND gate 32 is connected to an input terminal of an inverter 33.

An analog switch 34 is connected between the output terminal 14-2 and the node N4, so that the switch 34 is turned on and off in accordance with output signals of the inverter 33 AND gate 32. The analog switch 34 includes: a PMOS transistor, which is turned on/off in response to an output signal of the inverter 33; and a NMOS transistor, which is turned on/off in response to an output signal of the AND gate 32. Those PMOS and NMOS transistors are connected in parallel.

In the switch circuit 12-8A, the operational amplifier 31 compares the output voltage Vo2 and reference voltage Vr2. In odd cycles, only when the output voltage Vo2 is smaller than the reference voltage Vr2, the switch 34 is turned on.

The switch circuits 12-1 to 12-3 are turned on in response to the switching signal EV1, and the switch circuits 12-4 to 12-6 are turned on in response to the switching signal OD1.

According to the second preferred embodiment, the switch circuits 12-7A and 12-8A perform intermittent switching operation in even cycles and odd cycles, respectively, which is a feature of this embodiment.

It is assumed that an output current Io1 is supplied from the output terminal 14-1 and an output current Io2 is supplied from the output terminal 14-2. The output voltage Vo1 at the output terminal 14-1 and the output voltage Vo2 at the output terminal 14-2 are defined in accordance with the ratio of capacitance between the voltage-dividing capacitors 11-1 and 11-2, and following formulas are met:

$Vo1 \approx VDD*C1/(C1+C2)$ $Vo2 \approx VDD*C2/(C1+C2)$ $Vr1 = Vo1$ $Vr2 = Vo2$ In even cycles, the operational amplifier 21 compares the output voltage Vo1 and the reference voltage Vr1, and turns the switch 24 on for a period in which the formula "te" of Vr1>Vo1" is met. The output terminal 14-1 supplies a total amount Q1 of electric charge, in which the formula "Q1= Io1*te" is met. On the other hand, in odd cycles, the operational amplifier 31 compares the output voltage Vo2 and the reference voltage Vr2, and turns the switch 24 on for a period "to" in which the formula "Vr1>Vo1" is met. The output terminal 14-2 supplies a total amount Q2 of electric charge, in which the formula "Q2=Io2*to" is met. The value Q1 in an even cycle and the value Q2 in an odd cycle are equal to each other, so that the power circuit is in a balanced state and the equations "Vo1≈VDD*C1/(C1+C2)" and "Vo2≈VDD*C2/(C1+C2)" are met. This means that steady amount of output voltages Vo1 and Vo2 are obtained.

Figure 5A:
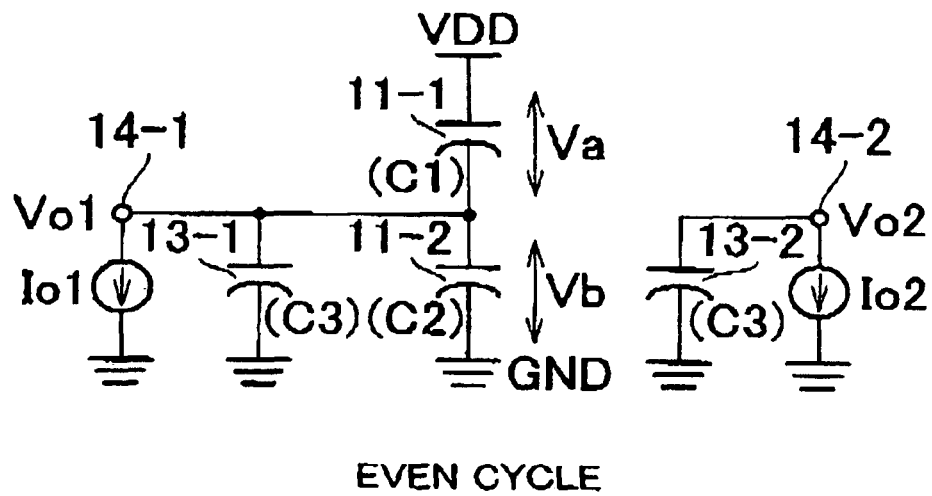
FIG. 5A is an equivalent circuit showing the power circuit of the power circuit according to the second preferred embodiment in even cycles.
Figure 5B:
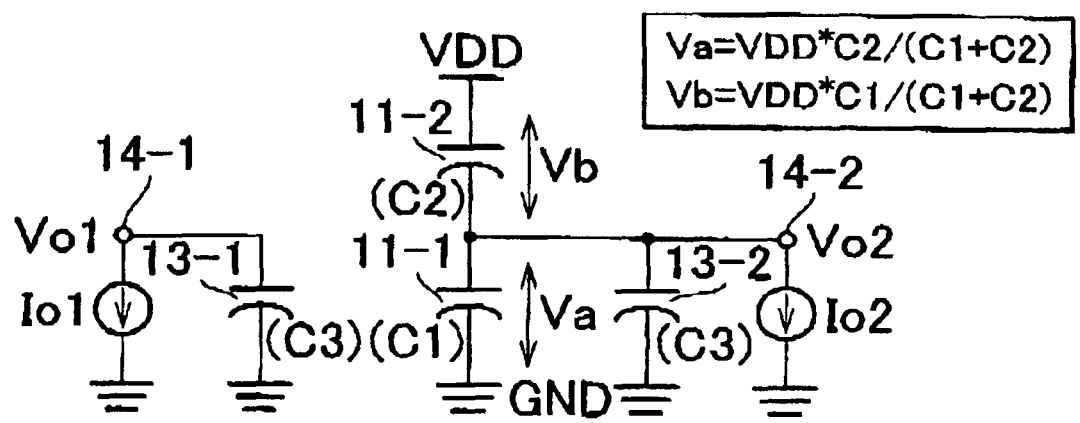
FIG. 5B is an equivalent circuit showing the power circuit of the power circuit according to the second preferred embodiment in odd cycles.
Figure 5C:
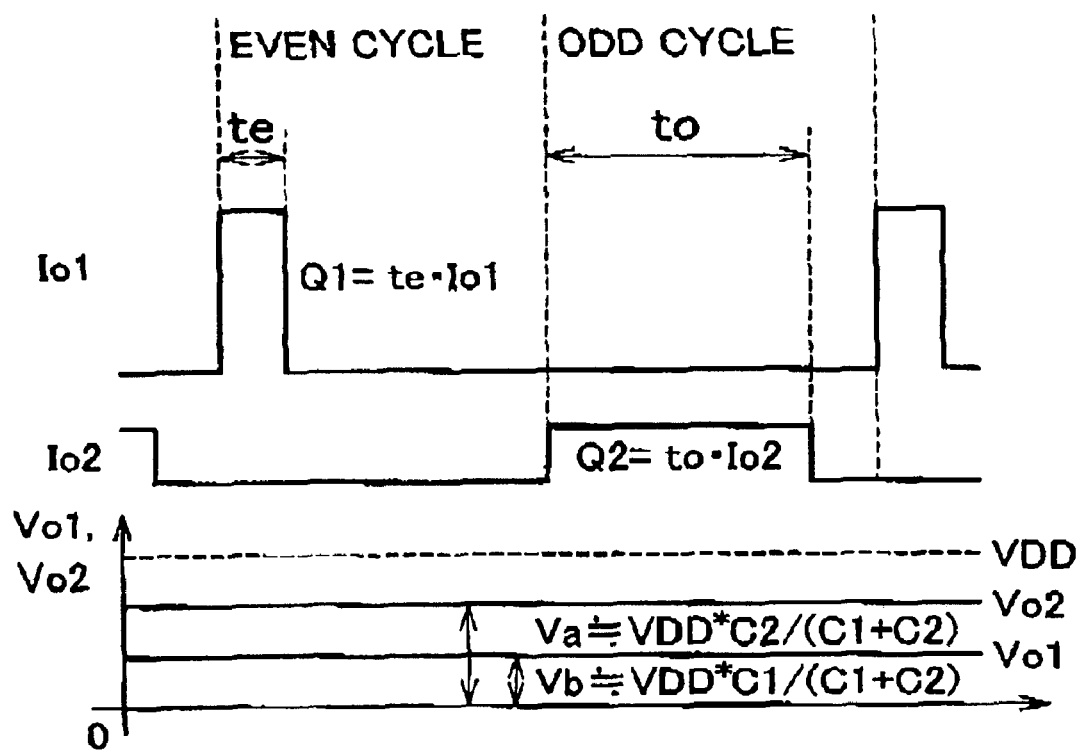
FIG. 5C is a timing chart showing the operation of the power circuit according to the second preferred embodiment, shown in FIG. 4A.

FIG. 5A is an equivalent circuit showing the power circuit of the power circuit according to the second preferred embodiment in even cycles. FIG. 5B is an equivalent circuit showing the power circuit of the power circuit according to the second preferred embodiment in odd cycles. FIG. 5C is a timing chart showing the operation of the power circuit according to the second preferred embodiment, shown in FIG. 4A.

According to the second preferred embodiment, the switch circuits 12-7A and 12-8A perform intermittent switching operation in even cycles and odd cycles, respectively, so that the following advantages are obtained:

(i) Electric charge to be supplied to the smoothing capacitors 13-1 and 13-2 is controlled in accordance with variation of levels of the output current Io1 and Io2, supplied from the output terminals 14-1 and 14-2; and therefore, the output voltage signals Vo1 and Vo2 can be obtained reliably and precisely.

(ii) When the current Io1 and Io2 is small, the switches 24 and 34 are not turned on, so that power conversion efficiency in a low output current range is improved.

The switch circuits 12-1 to 12-3 can be designed to have the same circuitry as the switch circuit 12-7A, which performs intermittent switching. In the same manner, the switch circuits 12-4 to 12-6 can be designed to have the same circuitry as the switch circuit 12-8A, which performs intermittent switching. The switch circuits 12-1 to 12-3 for even cycles may be turned on/off in accordance with output signals of the AND gate 22 and inverter 23 in the switch circuit 12-7A. The switch circuits 12-4 to 12-6 for odd cycles may be turned on/off in accordance with output signals of the AND gate 32 and inverter 33 in the switch circuit 12-8A. As a result, power conversion efficiency in a low output current range is improved.

Third Preferred Embodiment

Figure 6:
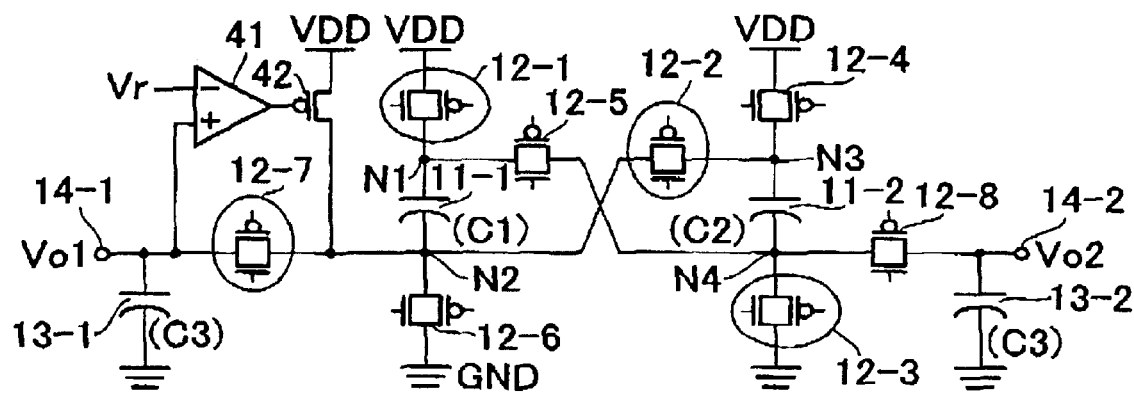
FIG. 6 is a circuit diagram showing a power circuit according to a third preferred embodiment of the present invention.

FIG. 6 is a circuit diagram showing a power circuit according to a third preferred embodiment of the present invention. In this embodiment, the same and corresponding elements to those in the first and second preferred embodiments, shown in FIGS. 2, 3A, 3B, 4, 5A, 5B, and 5C are represented by the same reference numerals and the same description is no repeated.

The power circuit includes a voltage-dividing capacitor 11-1, having a capacitance of C1; another voltage-dividing capacitor 11-2, having a capacitance of C2; first to third and seventh switch circuits 12-1 to 12-3 and 12-7 for even cycles; fourth to sixth and eighth switch circuits 12-4 to 12-6 and 12-8 for odd cycles; a first smoothing capacitor 13-1, which has a capacitance of C3 and is connected to a first output terminal 14-1; and a second smoothing capacitor 13-2, which has a capacitance of C4 and is connected to a second output terminal 14-2.

The power circuit is designed to operate in a first (Even) cycle and a second (Odd) cycle. In the Even cycles, the first to third and seventh switch circuits 12-1 to 12-3 and 12-7 are turned on, while in the Odd cycles, the fourth to sixth and eighth switch circuits 12-5 to 12-6 and 12-8 are turned on. Those switch circuits 12-1 to 12-8 may be operated in accordance with a switching signal, supplied from a switching pulse generating circuit 4, shown in FIG. 1. Each of the switch circuits 12-1 to 12-8 is an analog switch including a PMOS transistor and a NMOS transistor.

A first power node (VDD node) is connected to a first node N1 via the first switch circuit 12-1. The first node N1 is connected to a second node N2 via anode and cathode of the voltage-dividing capacitor 11-2. The second node N2 is connected to a third node N3 via the switch circuit 12-2. The third node N3 is connected to a fourth node N4 via an anode and a cathode of the voltage-dividing capacitor 11-2. The fourth node N4 is connected to a second power node, GND node, via the switch circuit 12-3.

The VDD node is connected to the third node N3 via the switch circuit 12-4. The third node N3 is connected through anode and cathode of the voltage-dividing capacitor 11-2 to the fourth node N4. The fourth node N4 is connected to the first node N1 via the switch circuit 12-5. The first node N1 is connected to the second node N2 via anode and cathode of the voltage-dividing capacitor 11-1.

The second node N2 is connected to the GND node via the switch circuit 12-6. The second node N2 is connected to a first output terminal 14-1, which outputs a first output voltage Vo1, via the switch circuit 12-7. The first output terminal 14-1 is connected to the GND node via the first smoothing capacitor 13-1. The fourth node N4 is connected to a second output terminal 14-2, which outputs a second output voltage Vo2, via the switch circuit 12-8. The second output terminal 14-2 is connected to the GND node via the second smoothing capacitor 13-2.

In even cycles, the switch circuits 12-1 to 12-3 and 12-7 are turned on so that the anode and cathode of the voltage dividing capacitor 11-1 are connected to the VDD node and the first output terminal 14-1, respectively; and the anode and cathode of the voltage-dividing capacitor 11-2 are connected to the first output terminal 14-1 and the GND node, respectively. On the other hand, in odd cycles, the switch circuits 12-4 to 12-6 and 12-8 are turned on so that the anode and cathode of the voltage dividing capacitor 11-1 are connected to the second output terminal 14-2 and the GND node, respectively; and the anode and cathode of the voltage-dividing capacitor 11-2 are connected to the VDD node and the second output terminal 14-2, respectively. In such even cycles and odd cycles, the voltage-dividing capacitors 11-1 and 11-2 are alternated in position between the VDD node and GND node.

The feature of this embodiment is to add a negative feedback circuit (41 and 42), which includes an operational amplifier 41 and a PMOS transistor 42. The operational amplifier 41 is supplied with a reference voltage Vr and an output voltage Bo1. An output terminal of the operational amplifier 41 is connected to a gate of the PMOS transistor 42. A source and a drain of the PMOS transistor 42 are connected to the VDD node and the second node N3, respectively. The drain of the PMOS transistor 42 may be connected to the first output terminal 14-1.

Figure 7A:
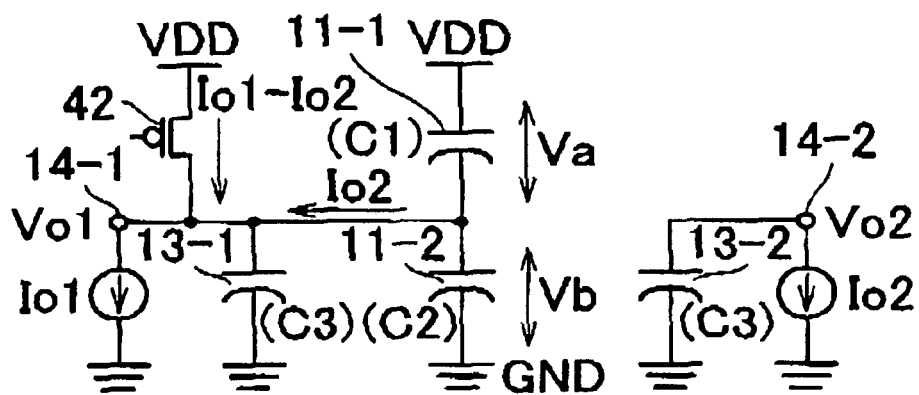
FIG. 7A is an equivalent circuit showing the power circuit of the power circuit according to the third preferred embodiment in even cycles.
Figure 7B:
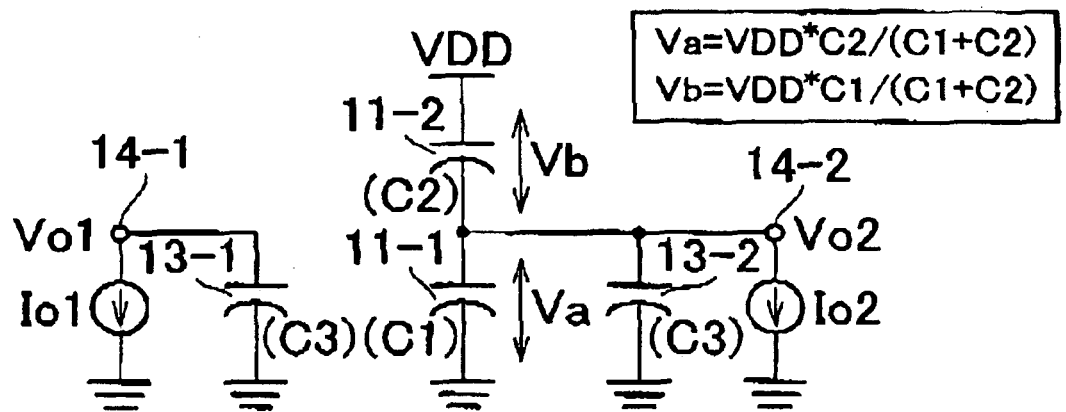
FIG. 7B is an equivalent circuit showing the power circuit of the power circuit according to the third preferred embodiment in odd cycles.

FIG. 7A is an equivalent circuit showing the power circuit of the power circuit according to the third preferred embodiment in even cycles. FIG. 7B is an equivalent circuit showing the power circuit of the power circuit according to the third preferred embodiment in odd cycles.

According to the third preferred embodiment, electric charge Q1, supplied from the output terminal 14-1, and electric charge Q2, supplied from the second output terminal 14-2 are compensated so that those amounts become the same.

In more detail, it is assumed that output current Io1, supplied from the output terminal 14-1 is larger than output current Io2, supplied from the output terminal 142. In an even cycle, when the switch circuits 12-1 to 12-3 and 12-7 are turned on for a time "t", the total amount of electric charge Q1, supplied from the output terminal 14-1, is calculated by a equation "Q1=Io1*t". In an odd cycle, when the switch circuits 12-4 to 12-6 and 12-8 are turned on for a time "t", the total amount of electric charge Q2, supplied from the output terminal 14-2, is calculated by a equation "Q2=Io2*t". In order to match Q1 and Q2, the difference of electric charge "ΔQ=(Io1−Io2)*t" is supplied from the PMOS transistor 42 to the output terminal 14-1. As a result, the power circuit operates in a steady condition in which the equations "Vo1 ≈VDD*C1/(C1+C2)" and "Vo2≈VDD*C2/(C1+C2)" are met.

As described above, according to the third preferred embodiment of the present invention, the output voltage Vo1 is detected and compared with the reference voltage Vr by the operational amplifier 41, and the PMOS transistor 42 is turned on/off in response to an output signal of the operational-amplifier 41. As a result, even if electric charge Q1, supplied from the output terminal 14-1 and electric charge Q2, supplied from the output terminal 14-2, are different from each other, the difference value of electric charge would be supplemented from the negative feedback circuit (41, 42). And, output voltage signals Vo1 (≈VDD*C1/(C1+C2)) and Vo2(≈VDD*C2/(C1+C2)), which are steady in state, are obtained.

The PMOS transistor 42 may be replaced by other types of transistor, such as a NMOS transistor. The negative feedback circuit 41 and 42 may be arranged at the side of the output terminal 14-2 instead of the side of the output terminal 14-2.

Although the negative feedback circuit is composed of an operational amplifier and a PMOS transistor, that may be composed of other elements. For example, electric charge Q1 and Q2 may be directly compared to each other using an operational amplifier, and the difference of electric charge is supplemented to the output terminal 14-1 or 14-2. In this case, the output voltage Vo1 and Vo2 can be obtained with more reliably and precisely.

Fourth Preferred Embodiment

Figure 8:
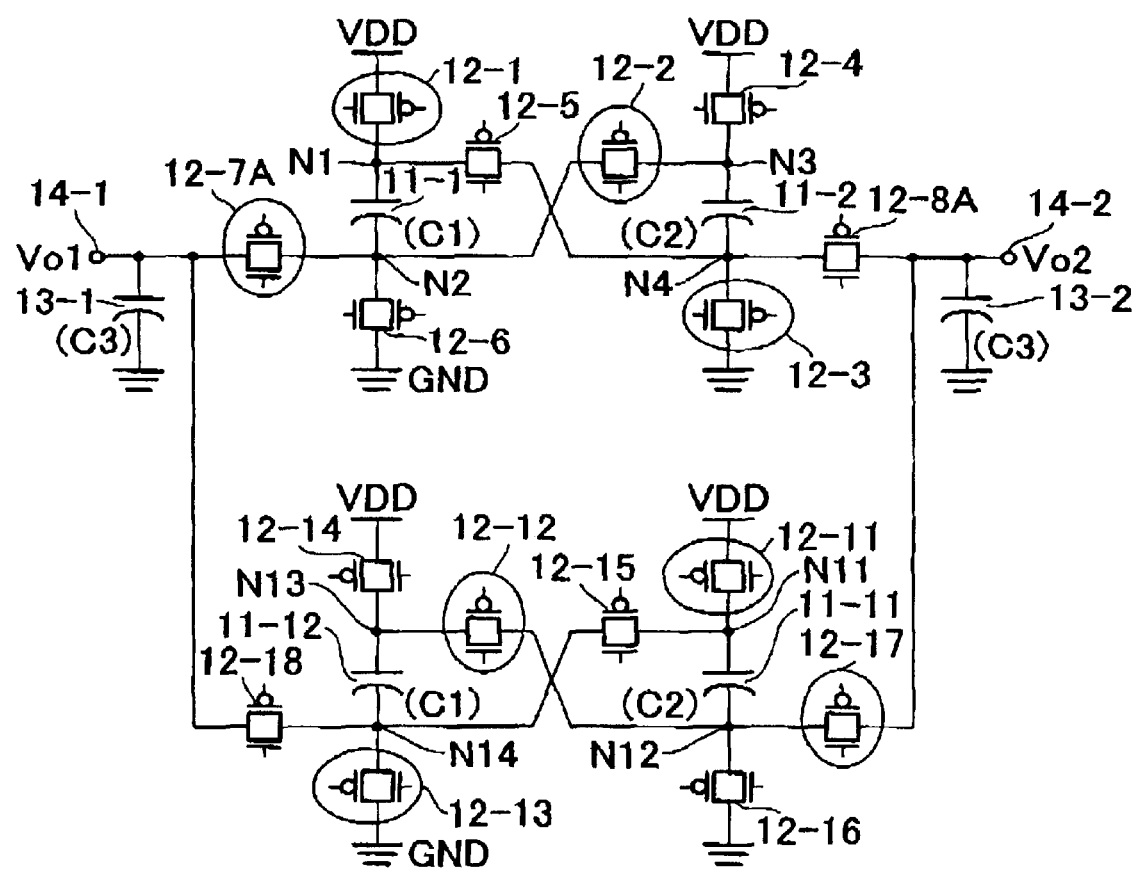
FIG. 8 is a circuit diagram showing a power circuit according to a fourth preferred embodiment of the present invention.

FIG. 8 is a circuit diagram showing a power circuit according to a fourth preferred embodiment of the present invention. In this embodiment, the same and corresponding elements to those in the first to third preferred embodiments, shown in FIGS. 2, 3A, 3B, 4, 5A, 5B, 5C, 6, 7A and 7B are represented by the same reference numerals and the same description is no repeated.

The power circuit according to this embodiment includes first and second power circuit units, each of which has the same structure as the power circuit shown in FIG. 2. Between a first output terminal 14-1 and a second output terminal 14-2, the first and second power circuit units are connected in parallel.

The power circuit includes a first smoothing capacitor 13-1, which has a capacitance of C3 and is connected to the first output terminal 14-1; and a second smoothing capacitor 13-2, which has a capacitance of C4 and is connected to the second output terminal 14-2.

The first power circuit unit includes a voltage-dividing capacitor 11-1, having a capacitance of C1; another voltage-dividing capacitor 11-2, having a capacitance of C2; first to third and seventh switch circuits 12-1 to 12-3 and 12-7 for even cycles; and fourth to sixth and eighth switch circuits 12-4 to 12-6 and 12-8 for odd cycles.

The first power circuit unit is designed to operate in a first (Even) cycle and a second (Odd) cycle. In the Even cycles, the first to third and seventh switch circuits 12-1 to 12-3 and 12-7 are turned on, while in the Odd cycles, the fourth to sixth and eighth switch circuits 12-4 to 12-6 and 12-8 are turned on. Those switch circuits 12-1 to 12-8 may be operated in accordance with a switching signal, supplied from a switching pulse generating circuit 4, shown in FIG. 1. Each of the switch circuits 12-1 to 12-8 is an analog switch including a PMOS transistor and a NMOS transistor.

A first power node (VDD node) is connected to a first node N1 via the first switch circuit 12-1. The first node N1 is connected to a second node N2 via anode and cathode of the voltage-dividing capacitor 11-2. The second node N2 is connected to a third node N3 via the switch circuit 12-2. The third node N3 is connected to a fourth node N4 via an anode and a cathode of the voltage-dividing capacitor 11-2. The fourth node N4 is connected to a second power node, GND node, via the switch circuit 12-3.

The VDD node is connected to the third node N3 via the switch circuit 12-4. The third node N3 is connected through anode and cathode of the voltage-dividing capacitor 11-2 to the fourth node N4. The fourth node N4 is connected to the first node N1 via the switch circuit 12-5. The first node N1 is connected to the second node N2 via anode and cathode of the voltage-dividing capacitor 11-1.

The second node N2 is connected to the GND node via the switch circuit 12-6. The second node N2 is connected to the first output terminal 14-1, which outputs a first output voltage Vo1, via the switch circuit 12-7. The first output terminal 14-1 is connected to the GND node via the first smoothing capacitor 13-1. The fourth node N4 is connected to the second output terminal 14-2, which outputs a second output voltage Vo2, via the switch circuit 12-8. The second output terminal 14-2 is connected to the GND node via the second smoothing capacitor 13-2.

In even cycles, the switch circuits 12-1 to 12-3 and 12-7 are turned on so that the anode and cathode of the voltage dividing capacitor 11-1 are connected to the VDD node and the first output terminal 14-1, respectively; and the anode and cathode of the voltage-dividing capacitor 11-2 are connected to the first output terminal 14-1 and the GND node, respectively. On the other hand, in odd cycles, the switch circuits 12-4 to 12-6 and 12-8 are turned on so that the anode and cathode of the voltage dividing capacitor 11-1 are connected to the second output terminal 14-2 and the GND node, respectively; and the anode and cathode of the voltage-dividing capacitor 11-2 are connected to the VDD node and the second output terminal 14-2, respectively. In such even cycles and odd cycles, the voltage-dividing capacitors 11-1 and 11-2 are alternated in position between the VDD node and GND node.

The second power circuit unit includes a voltage-dividing capacitor 11—11, having a capacitance of C2; another voltage-dividing capacitor 11-12, having a capacitance of C1; and first to third and seventh switch circuits 12-11 to 12-13 and 12-17 for even cycles; fourth to sixth and eighth switch circuits 12-14 to 12-16 and 12-18 for odd cycles.

The second power circuit unit is designed to operate in a first (Even) cycle and a second (Odd) cycle. In the Even cycles, the first to third and seventh switch circuits 12-11 to 12-13 and 12-17 are turned on, while in the Odd cycles, the fourth to sixth and eighth switch circuits 12-14 to 12-16 and 12-18 are turned on. Those switch circuits 12-11 to 12-18 may be operated in accordance with a switching signal, supplied from a switching pulse generating circuit 4, shown in FIG. 1. Each of the switch circuits 12-11 to 12-18 is an analog switch including a PMOS transistor and a NMOS transistor.

A first power node (VDD node) is connected to a first node N11 via the first switch circuit 12-11. The first node N11 is connected to a second node N12 via anode and cathode of the voltage-dividing capacitor 11-12. The second node N12 is connected to a third node N13 via the switch circuit 12—12. The third node N13 is connected to a fourth node N14 via an anode and a cathode of the voltage-dividing capacitor 11-12. The fourth node N14 is connected to a second power node, GND node, via the switch circuit 12-13.

The VDD node is connected to the third node N13 via the switch circuit 12-14. The third node N13 is connected through anode and cathode of the voltage-dividing capacitor 11-12 to the fourth node N14. The fourth node N14 is connected to the first node N11 via the switch circuit 12-15. The first node N11 is connected to the second node N12 via anode and cathode of the voltage-dividing capacitor 11—11.

The second node N12 is connected to the GND node via the switch circuit 12-16. The second node N12 is connected to the second output terminal 14-2 via the switch circuit 12-17. The fourth node N14 is connected to the first output terminal 14-1 via the switch circuit 12-18.

In even cycles, the switch circuits 12-11 to 12-13 and 12-17 are turned on so that the anode and cathode of the voltage dividing capacitor 11—11 are connected to the VDD node and the second output terminal 14-2, respectively; and the anode and cathode of the voltage-dividing capacitor 11-12 are connected to the second output terminal 14-2 and the GND node, respectively. On the other hand, in odd cycles, the switch circuits 12-14 to 12-16 and 12-18 are turned on so that the anode and cathode of the voltage dividing capacitor 11—11 are connected to the first output terminal 14-1 and the GND node, respectively; and the anode and cathode of the voltage-dividing capacitor 11-12 are connected to the VDD node and the first output terminal 14-1, respectively. In such even cycles and odd cycles, the voltage-dividing capacitors 11—11 and 11-12 are alternated in position between the VDD node and GND node.

According to the fourth preferred embodiment, the voltage-dividing capacitors 11-1, 11-2, 11—11 and 11-12 are connected to the output terminals 14-1 and 14-2 in each of even and odd cycles, so that the following advantages can be obtained:

(i) A higher level of output voltage can be obtained.

(ii) A ripple voltage of the output voltages Vo1 and Vo2 can be decreased.

Variation and Modification

The number of the voltage-dividing capacitors are not limited by two but may be more than three so as to change levels of the output voltages Vo1 and Vo2.

The switch circuits are not limited by analog switches but may be transistors such as PMOS and NMOS.

The switching signal ED1 and OD1 can be generated by another circuit than the switching pulse generating circuit 4, shown in FIG. 1.

What is claimed is:

1. A power circuit, comprising:
   a first power node supplying a first level of power;
   a second power node supplying a second level of power, which is lower than the first level;
   a first voltage-dividing capacitor, comprising an anode which is capable to be connected to the first power node and a cathode which is capable to be connected to the second power node;
   a second voltage-dividing capacitor, comprising an anode which is capable to be connected to the first power node and a cathode which is capable to be connected to the second-power node;
   an output terminal supplying an output voltage in first and second cycles, which are occurred alternately; and
   a control circuit functioning to connect, in the first cycle, the anode of the first voltage dividing capacitor to the first power node, the cathode of the first voltage dividing capacitor to the output terminal and to the anode of the second voltage-dividing capacitor, and the cathode of the second voltage-dividing capacitor to the second power node; and in the second cycle, the anode of the second voltage dividing capacitor to the first power node, the cathode of the second voltage dividing capacitor to the output terminal and to the anode of the first voltage-dividing capacitor, and the cathode of the first voltage-dividing capacitor to the second power node.

2. A power circuit according to claim 1, further comprising:
   a first node connected between the first power node and the anode of the first voltage-dividing capacitor;
   a second node connected between the cathode of the first voltage-dividing capacitor and the second power node;
   a third node connected between the first power node and the anode of the second voltage-dividing capacitor; and
   a fourth node connected between the cathode of the second voltage-dividing capacitor and the second power node, wherein;
   the output terminal comprises a first output node, and
   the control circuit comprises:
   1) a first switch circuit, which is connected between the first power node and the first node, and is turned on in the first cycle and is turned off in the second cycle;
   2) a second switch circuit, which is connected between the second node and the third node, and is turned on in the first cycle and is turned off in the second cycle;
   3) a third switch circuit, which is connected between the fourth node and the second power node, and is turned on in the first cycle and is turned off in the second cycle;
   4) a fourth switch circuit, which is connected between the first power node and the third node, and is turned on in the second cycle and is turned off in the first cycle;
   5) a fifth switch circuit, which is connected between the first node and the fourth node, and is turned on in the second cycle and is turned off in the first cycle;
   6) a sixth switch circuit, which is connected between the second node and the second power node, and is turned on in the second cycle and is turned off in the first cycle; and
   7) a seventh switch circuit, which is connected between the second node and the first output node, and is turned on in the first cycle and is turned off in the second cycle.

3. A power circuit according to claim 1, further comprising:
   a first node connected between the first power node and the anode of the first voltage-dividing capacitor;
   a second node connected between the cathode of the first voltage-dividing capacitor and the second power node;
   a third node connected between the first power node and the anode of the second voltage-dividing capacitor; and
   a fourth node connected between the cathode of the second voltage-dividing capacitor and the second power node, wherein
   the output terminal comprises a second output node, and
   the control circuit comprises:
   1) a first switch circuit, which is connected between the first power node and the first node, and is turned on in the first cycle and is turned off in the second cycle;
   2) a second switch circuit, which is connected between the second node and the third node, and is turned on in the first cycle and is turned off in the second cycle;
   3) a third switch circuit, which is connected between the fourth node and the second power node, and is turned on in the first cycle and is turned off in the second cycle;
   4) a fourth switch circuit, which is connected between the first power node and the third node, and is turned off in the first cycle and is turned on in the second cycle;
   5) a fifth switch circuit, which is connected between the first node and the fourth node, and is turned on in the second cycle and is turned off in the first cycle;
   6) a sixth switch circuit, which is connected between the second node and the second power node, and is turned on in the second cycle and is turned off in the first cycle; and
   7) an eighth switch circuit, which is connected between the fourth node and the second output node, and is turned on in the second cycle and is turned off in the first cycle.

4. A power circuit according to claim 1, further comprising:
   a first node connected between the first power node and the anode of the first voltage-dividing capacitor;
   a second node connected between the cathode of the first voltage-dividing capacitor and the second power node;
   a third node connected between the first power node and the anode of the second voltage-dividing capacitor; and
   a fourth node connected between the cathode of the second voltage-dividing capacitor and the second power node, wherein
   the output terminal comprises a first output node and a second output node, and the control circuit comprises:
1) a first switch circuit, which is connected between the first power node and the first node, and is turned on in the first cycle and is turned off in the second cycle;
2) a second switch circuit, which is connected between the second node and the third node, and is turned on in the first cycle and is turned off in the second cycle;
3) a third switch circuit, which is connected between the fourth node and the second power node, and is turned on in the first cycle and is turned off in the second cycle;
4) a fourth switch circuit, which is connected between the first power node and the third node, and is turned off in the first cycle and is turned on in the second cycle;
5) a fifth switch circuit, which is connected between the first node and the fourth node, and is turned on in the second cycle and is turned off in the first cycle;
6) a sixth switch circuit, which is connected between the second node and the second power node, and is turned on in the second cycle and is turned off in the first cycle;
7) a seventh switch circuit, which is connected between the second node and the first output node, and is turned on in the first cycle and is turned off in the second cycle; and
8) an eighth switch circuit, which is connected between the fourth node and the second output node, and is turned on in the second cycle and is turned off in the first cycle.

5. A power circuit according to claim 4, further comprising:
a first smoothing capacitor connected between the first output terminal and the second power node; and
a second smoothing capacitor Connected between the second output terminal and the second power node.

6. A power circuit according to claim 5, wherein,
each of the smoothing capacitors has a capacitance which is small enough than those of the first and second voltage-dividing capacitors.

7. A power circuit according to claim 6, wherein
the same amount of output current "Io" is flowing through the first and second output nodes,
the following four formulas are met:

$$\text{``Tc''} \ll C3*Vo1/Io$$

$$\text{``Tc''} < C3*Vo2/Io$$

$$Vo1 \approx VDD*C1/(C1+C2)$$

$$Vo2 \approx VDD*C2/(C1+C2)$$

where, "Tc" is a period of time for each of the first and second cycles; "Vo1" is a voltage at the first output node; "Vo2" is a voltage at the second output node; "C3" is a capacitance of each of the smoothing capacitors; "C1" is a capacitance of the first voltage-dividing capacitor; "C2" is a capacitance of the second voltage-dividing capacitor; and "VDD" is a voltage of the first power node.

8. A power circuit according to claim 4, wherein,
the seventh and eighth switch: circuits are analog system of switch circuits.

9. A power circuit according to claim 4, wherein
the seventh switch circuit comprises a first operational amplifier, having a first input terminal, to which the first output node is connected, and a second input terminal, to which a first reference voltage is supplied; and a switch circuit, which is controlled in accordance with an output signal of the operational amplifier, and
the eighth switch circuit comprises a second operational amplifier, having a first input terminal, to which the second output node is connected, and a second input terminal, to which a second reference voltage is supplied; and a switch circuit, which is controlled in accordance with an output signal of the operational amplifier.

10. A power circuit according to claim 4, further comprising:
a negative feedback circuit, which compensates the difference of electric charge between the first output node and the second output node.

11. A power circuit according to claim 10, wherein
the negative feedback circuit comprises an operational amplifier, having a first input terminal connected to the first output node and a second input terminal to which a predetermined reference voltage is supplied; and a transistor a gate of which is connected to an output terminal of the operational amplifier.

12. A power circuit, comprising:
a first unit, which comprise:
1) a first power node supplying a first level of power;
2) a second power node supplying a second level of power, which is lower than the first level;
3) a first voltage-dividing capacitor, comprising an anode which is capable to be connected to the first power node and a cathode which is capable to be connected to the second power node;
4) a second voltage-dividing capacitor, comprising an anode which is capable to be connected to the first power node and a cathode which is capable to be connected to the second power node;
5) an output terminal supplying an output voltage in first and second cycles, which are occurred alternately; and
6) a control circuit functioning to connect, in the first cycle, the anode of the first voltage dividing capacitor to the first power node, the cathode of the first voltage dividing capacitor to the output terminal and to the anode of the second voltage-dividing capacitor, and the cathode of the second voltage-dividing capacitor to the second power node; and in the second cycle, the anode of the second voltage dividing capacitor to the first power node, the cathode of the second voltage dividing capacitor to the output terminal and to the anode of the first voltage-dividing capacitor, and the cathode of the first voltage-dividing capacitor to the second power node; and
a second unit, which has the same components as the first unit and is electrically arranged in parallel with the first unit to the output terminal in an antisymmetric manner.

13. A power circuit according to claim 12, wherein each of the first and second units further comprises:
a first node connected between the first power node and the anode of the first voltage-dividing capacitor;
a second node connected between the cathode of the first voltage-dividing capacitor and the second power node;
a third node connected between the first power node and the anode of the second voltage-dividing capacitor; and a fourth node connected between the cathode of the second voltage-dividing capacitor and the second power node, wherein;

the output terminal comprises a first output node, and the control circuit comprises:

1) a first switch circuit, which is connected between the first power node and the first node, and is turned on in the first cycle and is turned off in the second cycle;
2) a second switch circuit, which is connected between the second node and the third node, and is turned on in the first cycle and is turned off in the second cycle;
3) a third switch circuit, which is connected between the fourth node and the second power node, and is turned on in the first cycle and is turned off in the second cycle;
4) a fourth switch circuit, which is connected between the first power node and the third node, and is turned off in the first cycle and is turned on in the second cycle;
5) a fifth switch circuit, which is connected between the first node and the fourth node, and is turned on in the second cycle and is turned off in the first cycle;
6) a sixth switch circuit, which is connected between the second node and the second power node, and is turned on in the second cycle and is turned off in the first cycle; and
7) a seventh switch circuit, which is connected between the second node and the first output node, and is turned on in the first cycle and is turned off in the second cycle.

14. A power circuit according to claim 12, wherein each of the first and second units further comprises:

a first node connected between the first power node and the anode of the first voltage-dividing capacitor;
a second node connected between the cathode of the first voltage-dividing capacitor and the second power node;
a third node connected between the first power node and the anode of the second voltage-dividing capacitor; and
a fourth node connected between the cathode of the second voltage-dividing capacitor and the second power node, wherein
the output terminal comprises a second output node, and
the control circuit comprises:
1) a first switch circuit, which is connected between the first power node and the first node, and is turned on in the first cycle and is turned off in the second cycle;
2) a second switch circuit, which is connected between the second node and the third node, and is turned on in the first cycle and is turned off in the second cycle;
3) a third switch circuit, which is connected between the fourth node and the second power node, and is turned on in the first cycle and is turned off in the second cycle;
4) a fourth switch circuit, which is connected between the first power node and the third node, and is turned off in the first cycle and is turned on in the second cycle;
5) a fifth switch circuit, which is connected between the first node and the fourth node, and is turned on in the second cycle and is turned off in the first cycle;
6) a sixth switch circuit, which is connected between the second node and the second power node, and is turned on in the second cycle and is turned off in the first cycle; and
7) an eighth switch circuit, which is connected between the fourth node and the second output node, and is turned on in the second cycle and is turned off in the first cycle.

15. A power circuit according to claim 12, wherein each of the first and second units further comprises:

a first node connected between the first power node and the anode of the first voltage-dividing capacitor;
a second node connected between the cathode of the first voltage-dividing capacitor and the second power node;
a third node connected between the first power node and the anode of the second voltage-dividing capacitor; and
a fourth node connected between the cathode of the second voltage-dividing capacitor and the second power node, wherein
the output terminal comprises a first output node and a second output node, and
the control circuit comprises:
1) a first switch circuit, which is connected between the first power node and the first node, and is turned on in the first cycle and is turned off in the second cycle;
2) a second switch circuit, which is connected between the second node and the third node, and is turned on in the first cycle and is turned off in the second cycle;
3) a third switch circuit, which is connected between the fourth node and the second power node, and is turned on in the first cycle and is turned off in the second cycle;
4) a fourth switch circuit, which is connected between the first power node and the third node, and is turned off in the first cycle and is turned on in the second cycle;
5) a fifth switch circuit, which is connected between the first node and the fourth node, and is turned on in the second cycle and is turned off in the first cycle;
6) a sixth switch circuit, which is connected between the second node and the second power node, and is turned on in the second cycle and is turned off in the first cycle;
7) a seventh switch circuit, which is connected between the second node and the first output node, and is turned on in the first cycle and is turned off in the second cycle; and
8) an eighth switch circuit, which is connected between the fourth node and the second output node, and is turned on in the second cycle and is turned off in the first cycle.

16. A power circuit according to claim 15, wherein each of the first and second units further comprises:

a first smoothing capacitor connected between the first output terminal and the second power node; and
a second smoothing capacitor connected between the second output terminal and the second power node.

17. A power circuit according to claim 16, wherein
each of the smoothing capacitors has a capacitance which is small enough than those of the first and second voltage-dividing capacitors.

18. A power circuit according to claim 17, wherein the same amount of output current "Io" is flowing through the first and second output nodes, the following four formulas are met:

$$\text{``Tc''} \ll C3*Vo1/Io$$

$$\text{``Tc''} \ll C3*Vo2/Io$$

$$Vo1 \approx VDD*C1/(C1+C2)$$

$$Vo2 VDD*C2/(C1+C2)$$

where, "Tc" is a period of time for each of the first and second cycles; "Vo1" is a voltage at the first output node; "Vo2" is a voltage at the second output node; "C3" is a capacitance of each of the smoothing capacitors; "C1" is a capacitance of the first voltage-dividing capacitor; "C2" is a capacitance of the second voltage-dividing capacitor; and "VDD" is a voltage of the first power node.

19. A power circuit according to claim 15, wherein the seventh and eighth switch circuits are analog system of switch circuits.

20. A power circuit according to claim 15, wherein the seventh switch circuit comprises a first operational amplifier, having a first input terminal, to which the first output node is connected, and a second input terminal, to which a first reference voltage is supplied; and a switch circuit, which is controlled in accordance with an output signal of the operational amplifier, and the eighth switch circuit comprises a second operational amplifier, having a first input terminal, to which the second output node is connected, and a second input terminal, to which a second reference voltage is supplied; and a switch circuit, which is controlled in accordance with an output signal of the operational amplifier.

21. A power circuit according to claim 15, wherein each of the first and second unite further comprises a negative feedback circuit, which compensates the difference of electric charge between the first output node and the second output node.

22. A power circuit according to claim 21, wherein the negative feedback circuit comprises an operational amplifier, having a first input terminal connected to the first output node and a second input terminal to which a predetermined reference voltage is supplied; and a transistor a gate of which is connected to an output terminal of the operational amplifier.

* * * * *